United States Patent
Hilton

(10) Patent No.: US 7,756,787 B1
(45) Date of Patent: Jul. 13, 2010

(54) BILL PAYMENT OPTIMIZATION USING A GENETIC ALGORITHM

(75) Inventor: Kenneth W. Hilton, Half Moon Bay, CA (US)

(73) Assignee: Intuit Inc., Mountain View, CA (US)

( * ) Notice: Subject to any disclaimer, the term of this patent is extended or adjusted under 35 U.S.C. 154(b) by 1385 days.

(21) Appl. No.: 10/916,668

(22) Filed: Aug. 11, 2004

Related U.S. Application Data

(63) Continuation-in-part of application No. 10/349,700, filed on Jan. 22, 2003, now Pat. No. 7,124,105.

(51) Int. Cl.
*G06Q 40/00* (2006.01)

(52) U.S. Cl. ....................................... 705/40

(58) Field of Classification Search .............. 705/2, 705/39, 40, 1, 35; 706/13, 36; 715/255, 715/760, 764, 769; 707/101, 102, 104.1
See application file for complete search history.

(56) References Cited

U.S. PATENT DOCUMENTS

| | | | |
|---|---|---|---|
| 5,126,936 A | | 6/1992 | Champion et al. |
| 5,255,345 A | | 10/1993 | Shaefer |
| 5,644,727 A | | 7/1997 | Atkins |
| 5,699,528 A | * | 12/1997 | Hogan ............... 705/40 |
| 5,761,442 A | | 6/1998 | Barr et al. |
| 5,845,266 A | | 12/1998 | Lupien et al. |
| 5,848,403 A | * | 12/1998 | Gabriner et al. ........... 706/13 |
| 5,852,811 A | | 12/1998 | Atkins |
| 5,875,437 A | | 2/1999 | Atkins |
| 5,999,918 A | | 12/1999 | Williams et al. |
| 6,012,046 A | | 1/2000 | Lupien et al. |
| 6,055,517 A | | 4/2000 | Friend et al. |
| 6,078,904 A | | 6/2000 | Rebane |
| 6,098,051 A | | 8/2000 | Lupien et al. |
| 6,188,992 B1 | | 2/2001 | French |
| 6,240,399 B1 | | 5/2001 | Frank et al. |
| 6,393,409 B2 | | 5/2002 | Young et al. |
| 6,405,179 B1 | | 6/2002 | Rebane |

(Continued)

FOREIGN PATENT DOCUMENTS

WO     WO 96/18162     6/1996

(Continued)

OTHER PUBLICATIONS

Fu, Michael C., "Optimization for simulation; Theory Vs. Practice"; INFORMS Journal on Computing, v 14, n3; Summer 2002; pp. 1-18.*

(Continued)

*Primary Examiner*—Ella Colbert
(74) *Attorney, Agent, or Firm*—Osha • Liang LLP

(57) ABSTRACT

A genetic algorithm determines a plan for payment of payment obligations in accounts payable of a finance account. The genetic algorithm operates to satisfy certain objectives, including maximizing or minimizing the total amount of payments of the payment obligations on a given day within the amount of cash available for the given day. A genome population including a number of vectors is generated. The genome population is modified using a genetic algorithm, until at least one vector represents an optimal bill payment plan for the payment obligations such that payment of each payment obligation in accordance with the vector most nearly satisfies one or more objectives.

30 Claims, 3 Drawing Sheets

U.S. PATENT DOCUMENTS

| | | | |
|---|---|---|---|
| 6,484,152 | B1 | 11/2002 | Robinson |
| 6,532,453 | B1* | 3/2003 | Koza et al. .................... 706/13 |
| 6,601,044 | B1 | 7/2003 | Wallman |
| 6,606,615 | B1 | 8/2003 | Jennings et al. |
| 2001/0034662 | A1 | 10/2001 | Morris |
| 2002/0013754 | A1* | 1/2002 | Frank et al. ................... 705/36 |
| 2002/0077756 | A1* | 6/2002 | Arouh et al. .................. 702/20 |
| 2002/0091605 | A1 | 7/2002 | Labe, Jr. et al. |
| 2003/0088492 | A1 | 5/2003 | Damschroder |
| 2003/0233304 | A1 | 12/2003 | Dhurandhar et al. |
| 2004/0030622 | A1 | 2/2004 | Ramos et al. |
| 2004/0128219 | A1 | 7/2004 | Hilton |

FOREIGN PATENT DOCUMENTS

| | | |
|---|---|---|
| WO | WO 98/44443 | 10/1998 |
| WO | WO 98/44444 | 10/1998 |
| WO | WO 00/38094 | 6/2000 |
| WO | WO 00/39734 | 7/2000 |
| WO | WO 03/017683 A2 | 2/2003 |
| WO | WO 03/079150 A2 | 9/2003 |

OTHER PUBLICATIONS

Lu, Jane Wei-Zhen and Xu, Zong-Ben; "An empirical comparison of three novel genetic algorithms"; Engineering Computations, v17, n8; 2000; pp. 1-14.*

Ferrar, Richard and King, William; "Rip first or cut first? Use 'evolution' to choose"; Wood Technology, v126, n7; Aug. 1999; pp. 1-5.*

Widrow, Bernard, Rumelhart, David, and Lehr, Michael A.; "Neural Networks: Applications in industry, business, and science" Communications of the ACM, v 37, n3; Mar. 1994; pp. 1-16.*

Felsman, Susan and Yu, Edmund; "Intelligent Agents: A Primer. (Technology Information)"; Searcher, 7, 9, 42; Oct. 1999; pp. 1-16.*

Frey, Jeffery P., Simpson, Angus R., Dandy, Green C., Murphy, Lauri J., and Farrill, Terry W.; "Genetic Algorithm pipeline network optimization; the next generation in distribution system analysis"; Public Works, v127, n7; Jun. 1996; pp. 1-6.*

Rees, J. and Koehler, G.J.; "Leadership and group search in group decision support systems"; Decision Support Systems, vol. 30, No. 1; Dec. 15, 2000; p. 1.*

De la Maza, Michael and Yuret, Deniz; "Dynamic hill climbing. (a new optimization algorithm) (Technical)";AI Expert, V9, n3; Mar. 1994; pp. 1-4.*

Bo Yang, Xiao-Hong Su, and Ya-Dong Wang; BP Neural Network Optimization Based on an Improved Genetic Algorithm; IEEE; Nov. 4-5, 2002; pp. 64-67.*

Alander, Jarmo T., "An Indexed Bibliography of Genetic Algorithms in Economics," drafted May 18, 2000, Department of Information Technology and Production Economics, University of Vaasa, Report Series No. 94-1-ECO.

Bao, Paul et al, "A Hybrid Portfolio Theory Model Based on Genetic Algorithm and Vector Quantization," Oct. 1998, 1998 Proceedings of IEEE Conference on Systems, Man and Cybernetics, San Diego, California, pp. 4301-4306.

Bedau, Mark A., et al, "Visualizing Waves of Evolutionary Activity of Alleles," Jul. 13, 1999, Proceedings of the 1999 Genetic and Evolutionary Computation Conference Workshop Program, Orlando, Florida, pp. 96-98.

Butler, James M., et al, "EDDIE Beats the Bookies," Dec. 15, 1995, Wiley InterScience Software—Practice & Experience, vol. 28, Issue 10 (Aug. 1998), pp. 1033-1043.

Chan, Man-Chung et al, "Genetic Algorithms in Multi-Stage Asset Allocation System," Oct. 2002, 2002 Proceedings of IEEE International Conference on System, Man and Cybernetics, vol. 3, pp. 316-321.

Chen, Shu-Heng, "Evolutionary Computation in Financial Engineering: A Roadmap of GAs and GP," date unknown, Financial Engineering News, vol. 2, No. 4 (Sep. 1998), 10 pages.

Chen, Shu-Heng, "On the Relevance of Genetic Programming to Evolutionary Economics," 2001, Evolutionary Controversy in Economics Towards a New Method in Preference of Trans Discipline, Springer-Verlag, Tokyo, pp. 135-150.

Dempster, M. et al, "A Real-Time Adaptive Trading System Using Genetic Programming," 2001, Quantitative Finance vol. 1, Institute of Physics Publishing, pp. 397-413.

Dhar, Vasant et al, Abstract of "Data Mining and Knowledge Discovery" (online), Oct. 2000, Kluwer Journals [retrieved on Mar. 26, 2004]. Retrieved from the Internet: <URL: http://ipsapp007.klweronline.com/IPS/content/ext/x/J/4441/I/15/A/1/abstract.htm>.

Dunis, Christian L. et al, Abstract of "Forecasting and Trading Currently Volatility: An Application of Recurrent Neural Regression and Model Combination" (online), Jun. 2002, Wiley InterScience Journal of Forecasting [retrieved on Mar. 28, 2005]. Retrieved from the Internet: <URL: http://www3.interscience.wiley.com/cgi-bin/abstract/94516945/ABSTRACT>.

Foster, James A. et al, "Portfolio Selection with Genetic Algorithms," Apr. 4, 1996, University of Idaho, Department of Computer Science Laboratory for Applied Logic, 13 pages.

Frick, Andreas, et al, "A Genetic-Based Approach for the Derivation of Trading Strategies on the German Stock Market," 1996, Proceedings of $3^{rd}$ International Conference on Neural Information Processing, Hong Kong (Sep. 24-27, 1996), pp. 776-770.

Frick, Andreas, et al, "Genetic-Based Trading Rules—A New Tool to Beat the Market With?," 1996, Proceedings of $6^{th}$ International AFIR Colloquium, Nürnberg (Oct. 1-3, 1996), vol. I/II, pp. 997-1018.

Iba, Hitoshi et al., "Using Genetic Programming to Predict Financial Data," Sep. 1999, Proceedings of the Congress on Evolutionary Computation, vol. 1, pp. 244-251.

Jiang, Rui et al, "Discovering Investment Strategies in Portfolio Management: A Genetic Algorithm Approach," Proceedings of the $9^{th}$ International Conference on Neural Information Processing (Nov. 18-22, 2002), vol. 3, pp. 1206-1210.

Kai, Fu et al, "Training Neural Network with Genetic Algorithms for Forecasting the Stock Price Index," 1997, Proceedings of IEEE International Conference on Intelligent Processing Systems (Oct. 28-31, 1997), vol. 1, pp. 401-403.

Korczak, J. et al, Abstract of "Stock Timing Using Genetic Algorithms" (online), May 21, 2002, Wiley InterScience Applied Stochastic Models in Business and Industry (retrieved on Mar. 28, 2005). Retrieved from the Internet: <URL: http://www3.interscience.wiley.com/cgi-bin/abstract/93521062/ABSTRACT>.

Koza, John R., "Genetic Programming," Version 2 submitted Aug. 18, 1997, Encyclopedia of Computer Science and Technology.

Lam, Kin et al, Abstract of "Forecasting for the Generation of Trading Signals in Financial Markets" (online), Jan. 18, 2000, Wiley InterScience Journal of Forecasting [retrieved on Mar. 28, 2005]. Retrieved from the Internet: <URL: http://www3.interscience.wiley.com/cgi-bin/abstract/69500089/ABSTRACT>.

Leinweber, David J., "The Perils and Promise of Evolutionary Computation on Wall Street" (online), 2003, Journal of Investing, vol. 12, No. 13 [retrieved on Mar. 26, 2004]. Retrieved from the Internet: <URL: http://64.233.167.104/search?q=cache:g1ghdtvD7McJ:www.iijournals.com/common/getArticlePDF.asp%3FArticleID%3D1860...>.

Li, Jin et al, "Improving Technical Analysis Predictions: An Application of Genetic Programming," 1999, Proceedings, Florida Artificial Intelligence Research Symposium, Orlando, FL (1999), 13 pages.

Li, Jin et al, "Investment Decision Making Using FGP: A Case Study,"1999 IEEE Proceedings of the Congress on Evolutionary Computation, Washington, D.C. (Jul. 6-9, 1999), pp. 1253-1259.

Liao, Pen-Yang et al., "Dynamic Trading Strategy Learning Model Using Learning Classifier Systems," 2001, Proceedings of IEEE Congress on Evolutionary Computation, vol. 2, pp. 783-789.

Lin, Wen-Shiu et al., "A Study on Investment Decision Making Model: Genetic Algorithms Approach," 1999, Proceedings of IEEE International Conference on System, Man and Cybernetics (Oct. 12-15, 1999), vol. 1, pp. 1049-1054.

Mahfoud, Sam et al, "Financial Forecasting Using Genetic Algorithms," 1996, Journal of Applied Artificial Intelligence, vol. 10, No. 6, pp. 543-565.

Markose, Sheri et al., "Evolutionary Arbitrage for FTSE-100 Index Options and Futures," 2001, Proceedings of IEEE Congress on Evolutionary Computation, Seoul, So. Korea (May 27-20, 2001), vol. 1, pp. 275-282.

Nag, Ashok K. et al, Abstract of "Forecasting Daily Foreign Exchange Rates Using Genetically Optimized Neural Networks" (online), Jul. 12, 2002, Wiley InterScience Journal of Forecasting [retrieved on Mar. 28, 2005]. Retrieved from the Internet: <URL: http://www3.interscience.wiley.com/cgi-bin/abstract/96516078/ABSTRACT>.

Neeley, Christopher, et al, "Is Technical Analysis in the Foreign Exchange Market Profitable? A Genetic Programming Approach," Dec. 1997, Journal of Financial and Quantitative Analysis, Working Paper 1996-006C for the Federal Reserve Bank of St. Louis.

O'Neill, Michael, et al, "Evolving Market Index Trading Rules Using Grammatical Evolution," 2001, in EvoWorkshops, pp. 343-352.

Orito, Yukiko et al, "Index Fund Portfolio Selection by Using GA," 2001, Proceedings of IEEE International Conference on Computational Intelligence and Multimedia Applications (Oct. 30 to Nov. 1, 2001), pp. 118-122.

Schlottmann, Frank et al, "A Hybrid Genetic-Quantitative Method for Risk-Return Optimization of Credit Portfolios," 2001, Proceedings of the Conference of Quantitative Methods in Finance, Sydney, Australia, p. 55 (27 pages).

Setzkorn, Christian et al, Evolving Rule-Based Trading Systems, 2002, Department of Computer Science, University of Liverpool, Technical Report ULCS 02-005.

Tang, Jing et al, "Grid Technology in Financial Planning—A Methodology for Portfolio Structuring," date and source unknown.

Tang, Wansheng et al., "Fractional Programming Model for Portfolio with Probability Criterion," 2002 Proceedings of IEEE International Conference on Systems, Man and Cybernetics (Oct. 6-9, 2002), vol. 6, 4 pages.

Vacca, Luigi et al, "Managing Options Risk with Genetic Algorithms," Jan. 30, 1997, Proceedings of IEEE/IAFE Computational Intelligence in Finance Engineering Conference (Mar. 1997), New York, pp. 29-35.

Wang, Jun, Abstract of "Trading and Hedging in S&P 500 Spot and Futures Markets Using Genetic Programming" (online), Nov. 2, 2000, Wiley InterScience Journal of Forecasting [retrieved on Mar. 28, 2005]. Retrieved from the Internet: <URL: http://www3.interscience.wiley.com/cgi-bin/abstract/75000894/ABSTRACT>.

"List of Technical Trading Articles," date and source unknown, 7 pages.

Pacheco, M.A. et al., "Cash Flow Planning and Optimization Through Genetic Algorithms," ICA: Applied Computational Intelligence Laboratory, Departamento de Engenharia Eléctrica, Pontificia Universidade Católica do Rio de Janeiro, 6 pages, date unknown.

Cacho, Oscar et al., "A Genetic Algorithm Approach to Farm Investment," The Australian Journal of Agricultural and Resource Economics (Sep. 1999), vol. 43, Issue 3, pp. 305-322.

Chen, Shu-Heng et al., "Option Pricing with Genetic Algorithms: The Case of European-Style Options," Proceedings of the Seventh International Conference on Genetic Algorithms, Michigan State University (Jul. 19-23, 1997), pp. 704-711.

Gilli, Manfred et al., "Heuristic Approaches for Portfolio Optimization," Computing in Economics and Finance 2000 [online], Jul. 5, 2000, [retrieved on May 30, 2002]. Retrieved from the Internet: <URL: http/fmwww.bc.edu/cef00/papers/paper289.pdf>.

Kallel, Leila et al., "Alternative Random Initialization in Genetic Algorithms," Proceedings of the Seventh International Conference on Genetic Algorithms, Michigan State University (Jul. 19-23, 1997), pp. 268-275.

Mansini, Renata et al, "Heuristic Algorithms for the Portfolio Selection Problem With Minimum Transaction Lots," European Journal of Operational Research 114 (1999), pp. 219-233.

Mehta, Kumar et al., "Combined Rules Learnt Using Genetic Algorithms for Financial Forecasting," Proceedings of the Congress on Evolutionary Computation (CEC), Washington D.C. [online], Jun. 1999 [retrieved on May 30, 2002]. Retrieved from the Internet: <ULR: http://icarus.cc.uic.edu/~kmehta1/CEC99.pdf>.

Neuneier, Ralph, "Optimal Asset Allocation Using Adaptive Dynamic Programming," Advances in Neural Information Processing Systems (1996), vol. 8, pp. 952-958.

Noe, Thomas H. et al. "Corporate Financing: An Artificial Agent-Based Analysis," source unknown (Mar. 2000), pp. 1-47.

Pacheco, Marco Aurélio et al., "Cash Flow Planning and Optimization Through Genetic Algorithms," Computing in Economics and Finance 2000, Society for Computational Economics (2000) No. 333.

Sakanashi, Hidenori et al., "Adaptive Attention Control in Genetic Algorithm," IPSJ Journal Abstract, vol. 38 No. 07-001 [online], May 24, 2001 [retrieved on Nov. 5, 2002]. Retrieved from the Internet: <ULR: http://www.ipsj.or.jp/members//Journal/Eng/3807/article001.html>.

Tsutsui, Shigeyoshi et al., "A Real Coded Genetic Algorithm with an Explorer and an Exploiter Populations," Proceedings of the Seventh International Conference on Genetic Algorithms, Michigan State University (Jul. 19-23, 1997), pp. 238-245.

Wall, Matthew, "Overview of Genetic Algorithms," MIT Mechanical Engineering Department presentation on Introduction to Genetic Algorithms [online], date unknown [retrieved on Nov. 8, 2001]. Retrieved from the Internet: <ULR: http://lancet.mit.edu/~mbwall/presentations/IntroToGAs/P001.htm l>.

Goldberg, D. E., "Genetic Algorithms in Search, Optimization and Machine Learning," Addison-Wesley Longman Publishing Co., Inc. 1st Edition, 1989, pp. 122 and 124.

* cited by examiner

BILL PAYMENT OPTIMIZATION USING A GENETIC ALGORITHM

CROSS-REFERENCE TO RELATED APPLICATION

This application is a continuation-in-part application of, and claims priority under 35 U.S.C. §120 from, U.S. patent application Ser. No. 10/349,700, entitled "Cash Flow Optimization Using A Genetic Algorithm," filed on Jan. 22, 2003 now U.S. Pat. No. 7,124,105, the subject matter of which is incorporated by reference herein in its entirety.

TECHNICAL FIELD

The present invention relates generally to bill payment optimization and, more specifically, to using genetic algorithms to optimize bill payments in terms of making bill payments for a given day as close as possible to the amount of available cash on that given day while optimizing one or more objectives.

BACKGROUND OF THE INVENTION

Businesses or households generally have a set of accounts payables. For example, a company may have a tax bill to pay on April 15, salary payments to be made on April 28, lease payments to be made on May 1, etc. Businesses or households also have a certain amount of cash available for making payments of the accounts payable for a given day. Often times, businesses or households are particularly interested in figuring out the best way to utilize the amount of cash available for a given day for making payments of the accounts payable. They have a limited amount of cash available to make such payments on a given day, and thus would like to know which of the accounts payables and what fraction of those accounts payables they should pay on that day to make the best use of their limited amount of cash available on that day. They would also like to make payments of an amount as close as possible to the amount of cash available for that day, since that amount is what was earmarked for accounts payables for that given day.

In general, accounts payables have an amount to pay, a due date, certain penalties incurred for late payment, minimum required payment, and the like. One or more of these elements of the accounts payable should be considered to decide which of the account payables and what fraction of the account payables should be paid. For example, businesses may decide to make a certain payment on a given day earlier than the due date if there are certain benefits associated with early payments, such as a discount of the payment amount. Businesses may also decide not to make a certain payment on a given day even though the payment is due on that day, notwithstanding the penalties associated with late payments, because the amount of cash available on that day is less than the amount of payment to be made for that account payable. Businesses also may prefer lumping more than one payment to a single payee (vendor) on a given day together to minimize delivery cost, or may also prefer separating the payments for ease of identification and accounting.

Therefore, business and households should, but typically do not, consider various factors (or objectives) in deciding when and how much of a payment should be made on a given day, such as, maximizing the amount of payments made on a given day within the limits of the amount of cash available for a given day, maximizing or minimizing payments to a certain vendor or a certain account depending upon the importance of the vendor or account, maximizing discounts, minimizing late fees, minimizing new late fees, favoring late payables, favoring aged payables, minimizing delivery costs, favoring the least recently paid account, maximizing partial payments, minimizing full payments, maximizing the number of payables paid, minimizing the total days late, minimizing the total days early, etc. A very efficient bill payment plan (a plan dictating which and how much of the payment obligations of the accounts payable should be satisfied on that day) taking into consideration all of these objectives in an optimized manner could result in savings of a significant amount of money for the businesses.

It is a very complicated task to find a solution for an efficient bill payment plan while optimizing these various factors. Consider, for example, a highly simplified situation where the accounts payable includes 100 different payment obligations of $100 due on 10 different dates on a given day. The search space for this situation would involve devising a bill payment plan to pay all or some part of each payment obligation on the given day while satisfying the above-mentioned factors objectives. Assuming that payments can be made in $1 increments between $0 and $100, just to simplify the calculation, there will be 100 ways to make a payment for each payment obligation. This means that there will be 100 ways to make payments on 100 payment obligations on the given day, resulting in $100^{100}$ combinations of possible solutions, clearly too many to be each individually considered even on the most powerful computers in existence. In addition, a variety of the above-mentioned objectives should be considered when finding the solution with respect to a user-specified importance level for each objective. The solution space for such a situation will be enormous, discontinuous in scope and will typically involve non-linear, non-dimensional, and inter-dependent variables.

Such a complicated problem is very difficult to solve, but once a solution is obtained, it is easy to evaluate the solution. Such problems are called non-deterministic polynomial ("NP") problems, which mean that it is possible to guess the solution by some non-deterministic algorithm and then check the solution, both in polynomial time. Generally, NP problems may be solved by genetic algorithms. However, so far there has been no attempt to apply a genetic algorithm to finding a solution for optimizing a bill payment plan while optimizing certain objectives of a user.

SUMMARY OF INVENTION

The present invention solves this problem by generating a plan for making payments of payment obligations in accounts payable of a given finance account on a given day by using a genetic algorithm, while satisfying or optimizing certain objectives, including, but not limited to maximizing the amount of payment to be made on that given day within the limits of the amount of cash available for that given day. In another embodiment, the present invention may generate a bill payment plan for making payments of payment obligations in accounts payable of a given finance account on a given day by using a genetic algorithm, while satisfying or optimizing certain objectives, including, but not limited to minimizing the amount of payment to be made on that given day within the limits of the amount of cash available for that given day.

In one embodiment, a genome population including a number of genomes is generated. Each genome has a plurality of alleles each representing a fractional (percentage) amount of the payment obligation to be paid on that given day, and each allele corresponds to each payment obligation in the accounts payable. For example, if a payment of $50 is due to a payee on Sep. 30, 2004, then the allele of the genome corresponding to this payment obligation could represent a 0.25 fractional payment amount, which would mean paying 25% or $12.50 on that given day. Thus, a single genome may be understood to represent a bill payment plan for that given day, since it has a plurality of alleles defining the fractional payment amount for a number of accounts payable. Each genome is represented by a vector, list or other useful data structure.

The genome population is evaluated with respect to various objective functions. The objective functions provide a way of measuring the degree to which the payment of payment obligations in accordance with a genome vector on a given day satisfies one or more objectives. For example, the genomes can be evaluated with respect to maximizing the amount of payments made on a given day within the limits of the amount of cash available for a given day, maximizing or minimizing payments to a certain vendor or a certain account depending upon the importance of the vendor or account, maximizing discounts, minimizing late fees, minimizing new late fees, favoring late payables, favoring aged payables, minimizing delivery costs, favoring the least recently paid account, minimizing or maximizing partial payments, minimizing or maximizing full payments, maximizing the number of payables paid, minimizing the total days late, minimizing the total days early, etc.

The genome population is modified using a genetic algorithm, including introducing into the genome population new genomes (vectors) derived from other genomes (vectors), including the original or previously existing genomes (vectors). In the context of the present invention the terms "vector" and "genome" will be used interchangeably herein, but no limitation of genomes to a vector form of representation is intended. Various vectors which best match the desired criteria in each generation are selected as mating vectors from the first set of vectors based on their fitness, and then combined to obtain a second set of vectors, which are the offspring of the mating vectors. The resulting offspring vectors are preferably mutated, and used to replace selected ones of vectors in the genome population. The genome population is modified in this way until at least one vector represents a bill payment plan for making payments of the payment obligations on the given day such that payment of the payment obligations in accordance with the vector on that given day most nearly satisfies or optimizes the objectives, such as maximizing the amount of payments made on that given day within the limits of the amount of cash available for a given day, and the like. Note that the present invention is not concerned about future cash flow on subsequent days but is only concerned about satisfying objectives with the amount of cash available for payment of bills on that given day, and thus does not take into consideration accounts receivable information.

The present invention may be embodied in various forms, including computer program products, methods, and systems, special or general purpose computing devices or apparatuses, online services or systems, user interfaces, etc.

By employing a genetic algorithm in order to find a solution for optimizing a set of criteria, such as maximizing the amount of payments made on a given day within the limits of the amount of cash available for that given day, in the payment of payment obligations of the accounts payable on that given day, it is possible to search a potentially intractable solution space for an optimal solution in an acceptable amount of time.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
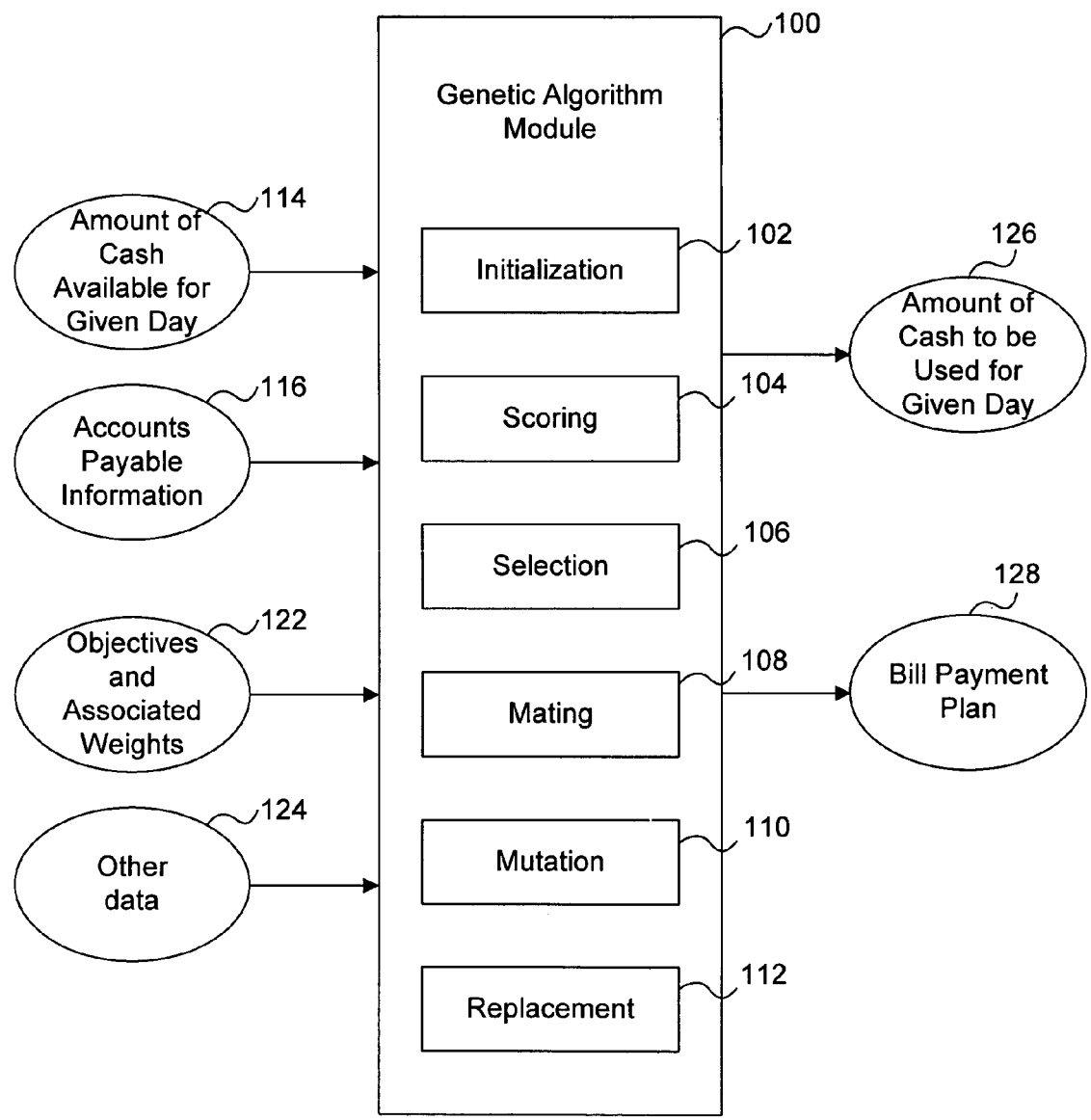
FIG. 1 illustrates the bill payment optimization system according to an embodiment of the present invention.

FIG. 1 illustrates the software architecture of a bill payment optimization system in accordance with one embodiment of the present invention. A genetic algorithm module 100 searches for an optimal bill payment plan that satisfies a number of objectives, including maximizing the amount of payments made on a given day within the limits of the amount of cash available for that given day as well as other objectives that are of interest to the business, and which generally impact the costs, timing, or efforts made in making payments to vendors. The genetic algorithm module 100 uses as its input data the amount of cash available for a given day ("available cash") 114, accounts payable information 116, a plurality of objectives and associated weights 122, and any other type of relevant data 124. Each of these sources of information is stored in appropriate local or remote databases or data storages. Based upon such input data, the genetic algorithm module 100 outputs a bill payment plan 128 describing which and how much (percentage) of the payment obligations in the accounts payable 116 should be paid while additionally satisfying a plurality of objectives 122, and a resultant amount of cash to be used for payments on that given day 126.

The available cash 114 is the amount of cash that may be used for payment of bills on the day when the genetic algorithm module 100 is used. In one embodiment, a user of the genetic algorithm module 100 manually inputs the available cash 114. In another embodiment, the available cash 114 is retrieved from a conventional relational or flat file database that is accessible to the genetic algorithm module 100. For example, many personal or business finance software applications, such as Intuit Inc.'s QuickBooks® and Quicken®, or Microsoft Corp.'s Money® use databases to store data pertaining to the user's cash balance. The available cash 114 may also be obtained, either manually or automatically, from the business's banking, such as through an online banking program. It is anticipated that the present invention in its embodiment as the genetic algorithm module 100 may be integrated into a business or personal finance software application, such as one of the foregoing applications.

The accounts payable information 116 includes a payment table having information relating to each of the payment obligations therein, such as the payment due date, payment amount, payee (vendor) information, late fees or penalties associated with the payment obligations in the accounts payable, and importance of the payee (vendor), and the like. The accounts payable information 116 also includes an account table having one or more accounts each corresponding to a billing matter and associated with one or more entries in the payment table. The accounts payable information 116 also includes a vendor table having one or more vendors each associated with one or more entries in the account table. The accounts payable information 116 may be provided manually by a user, or it may be obtained automatically by the genetic algorithm module 100 via appropriate connections with databases stored in personal or business finance application software or online information sources.

The manner in which the accounts payable information can be stored, and the manner in which the genetic algorithm module 100 retrieves such information from external databases or online information sources is well understood by those of ordinary skill in the art. In one embodiment, the module 100 is integrated into a financial management application, an accounting application that stores the accounting information in a local or remotely accessible database; in this case, the module 100 has direct programmatic access to the accounts payable information 116. In another embodiment where the module 100 is independent of an accounting package, then it can obtain access to the accounts payable information 116 through an application programming interface, or even simple data importation. The particular details of how the accounts payable information 116 is obtained are not material to the operation of the invention.

The objectives 122 comprise the constraints that the genetic algorithm module 100 takes into consideration and attempts to optimize as it finds a solution for generating the bill payment plan 128. Those objectives 122 include, but are not limited to, maximizing the amount of payments made on a given day within the limits of the amount of cash available for a given day, maximizing or minimizing payments to a certain vendor or a certain account depending upon the importance of the vendor or account, maximizing discounts, minimizing late fees, minimizing new late fees, favoring late payables, favoring aged payables, minimizing delivery costs, favoring the least recently paid account, minimizing or maximizing partial payments, minimizing or maximizing full payments, maximizing the number of payables paid, minimizing the total days late, minimizing the total days early, etc. In another embodiment, the objectives 122 may include minimizing (rather than maximizing) the amount of payments made on a given day within the limits of the amount of cash available for a given day while satisfying the other objectives. Certain objectives 122 can be defined with respect to the available cash 114. One of these objectives 122 is maximizing (or minimizing) the amount of payments 128 to be made on a given day within the limits of the available cash 114. In addition, each objective 122 is associated with a weight that describes the level of importance of the objective 122. The weight may be fixed or it may be provided by the user. The weight is applied to one or more objective functions that relate to the particular objective. Any other relevant data 124, such as postage or courier fee data, may be input as well, so long as it can be used to modify or adjust the operation of the objective functions, their input parameters, or the genetic algorithm module 100.

In one embodiment, the genetic algorithm module 100 comprises an initialization module 102, a scoring module 104, a selection module 106, a mating module 108, a mutation module 110, and a replacement module 112. The specific details of one implementation of these software modules will be explained below in conjunction with FIGS. 2 and 3. The genetic algorithm module 100 finds a solution for maximizing the amount of cash 126 to be used for payment of bills on a given day within the limit of the available cash 114 while optimizing the other objectives 122 and outputs the amount of cash 126 to be used for bill payment along with a bill payment plan 128 describing which and what fraction of the amount of the bills should be paid for each payment obligation in the accounts payable 116. Payments of the accounts payable 116 in accordance with the bill payment plan 128 will result in maximizing the amount of cash 126 to be used for payment of bills on a given day within the limit of the available cash 114 while optimizing the other objectives 122 according to user-specified weights.

Functional Model

Figure 2:
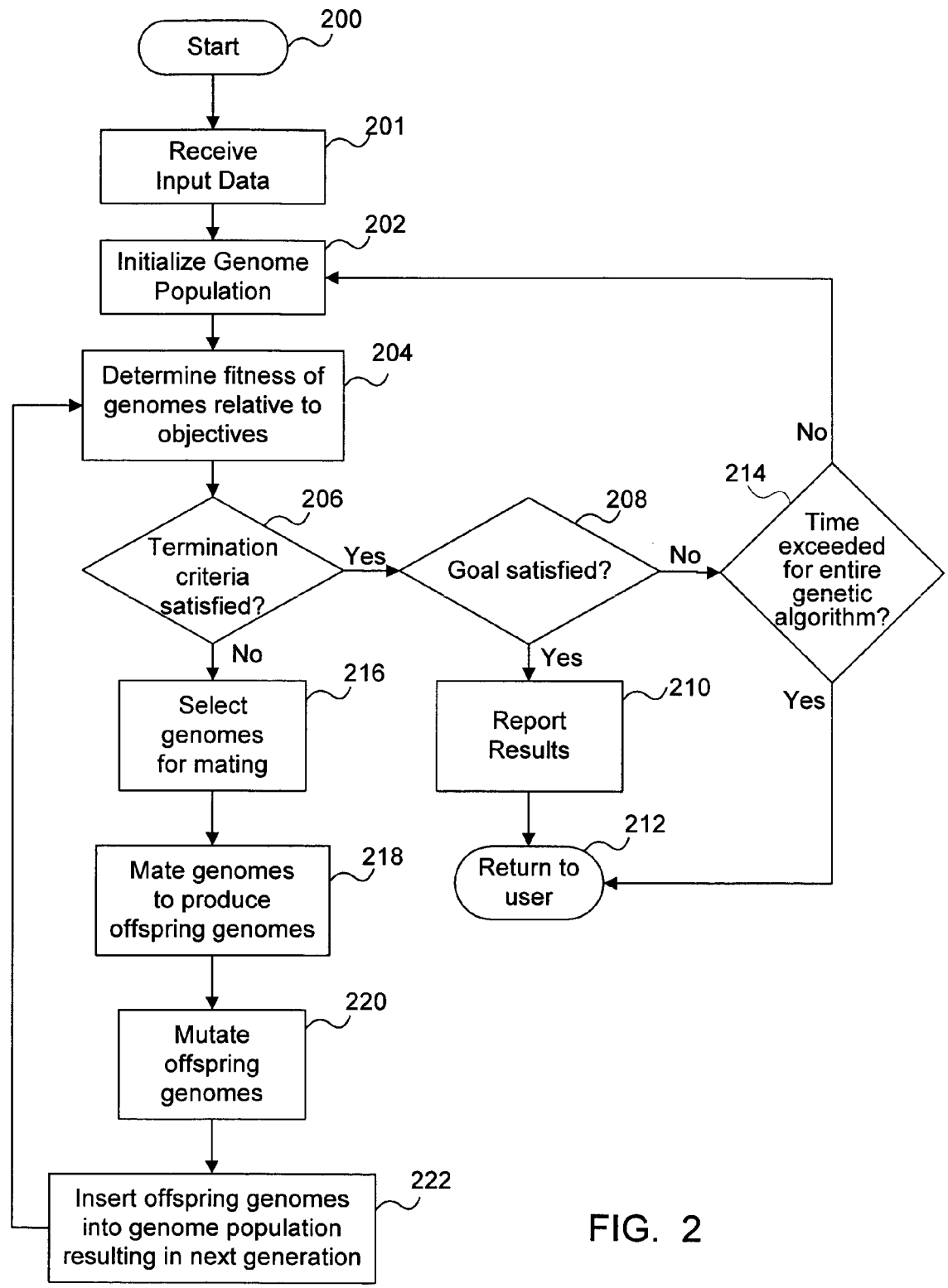
FIG. 2 is a flowchart illustrating the bill payment optimization genetic algorithm according to an embodiment of the present invention.
Figure 3:
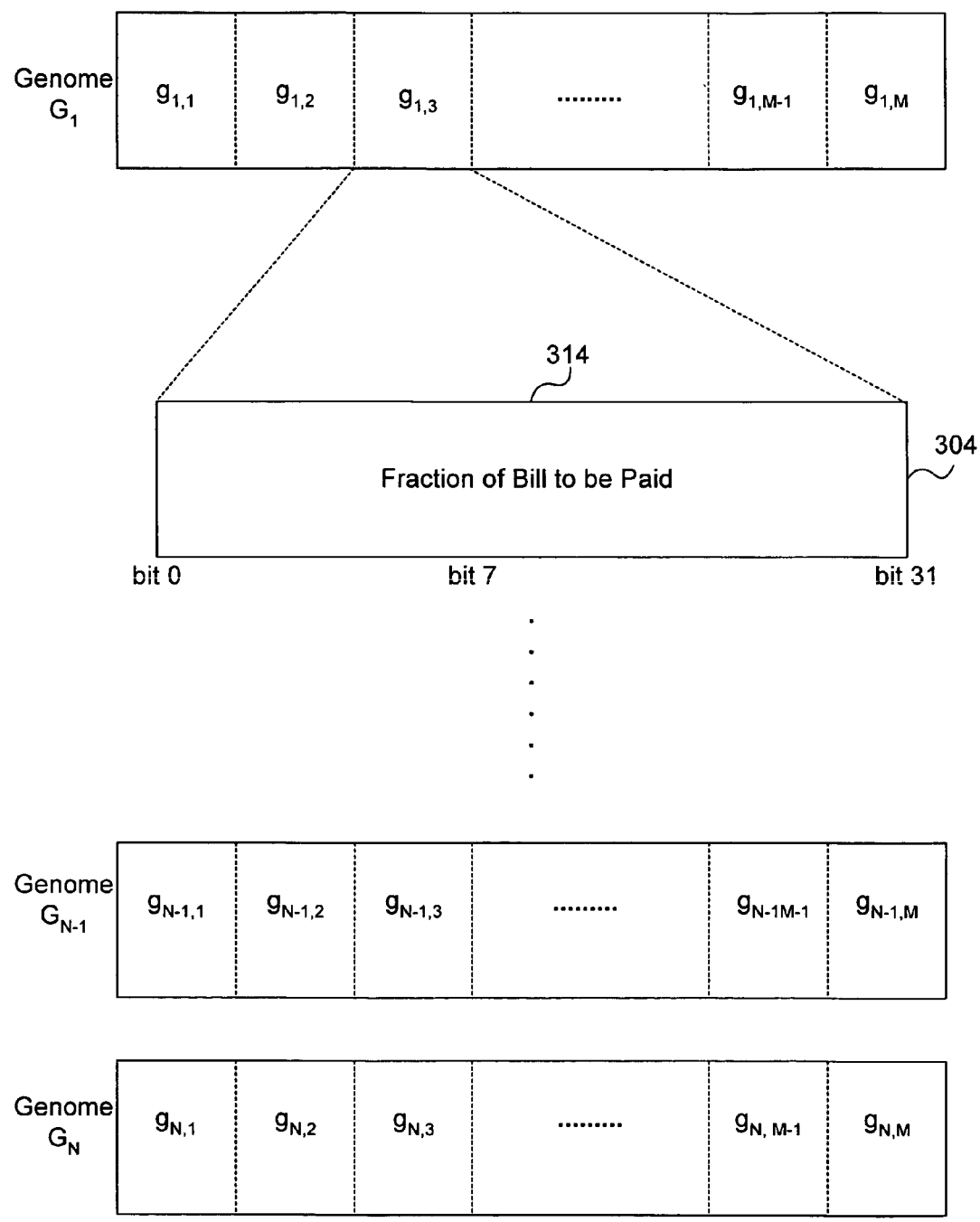
FIG. 3 is a diagram illustrating the genomes and alleles used in the bill payment optimization genetic algorithm according to an embodiment of the present invention.

FIG. 2 is a flowchart illustrating the overall operation of one embodiment of the bill payment optimization genetic algorithm module 200, and FIG. 3 is a diagram illustrating the genomes and alleles used in the bill payment optimization genetic algorithm according to one embodiment of the present invention. FIG. 2 will be explained with additional reference to FIG. 1.

Referring to FIG. 2 and also FIG. 1, the operation begins 200 with the genetic algorithm module 100 receiving 201 input data such as the available cash 114, accounts payable information 116, objectives and weights 122, and other relevant data 124. More specifically, and depending on the embodiment, the genetic algorithm module 100 retrieves the available cash 114, accounts payable information 116, objectives and weights 122, and other relevant data 124 from a database, such as a local database, or a remote database, such as one maintained on the Internet by a financial services online provider, and stores the information locally. For obtaining the objectives and their weights 122, the genetic algorithm module 100 can provide the user with a graphical or textual user interface presenting each of the objectives and having the user rank order them in terms of importance, or use a sequence of pairwise comparisons to determine the user's implicit ranking, or provide the list of the objectives, along with a control for each to allow the user to set the weight (e.g., 1 to 10) of the objective, which are then internally normalized. In addition, the user can select which objectives 122 to satisfy and which to ignore (either by removing the objectives from the later computation process, or by giving such objectives a weighting of 0). Input of the available cash 114 can likewise be made via a text or graphical user interface, when provided manually.

Initialization of Genome Population

Then, a genome population is initialized 202 by the initialization module 102. The genome population comprises a plurality of genomes. In the preferred embodiment, the genomes are in the form of vectors, though other data structures and implementations are certainly possible. An initial genome population of around 100 genomes is useful, but more or fewer can be used. In the context of the present invention the terms "vector" and "genome" will be used interchangeably herein, but no limitation of genomes to a vector form of representation is intended. Each genome comprises a plurality of "alleles" (otherwise referred to herein as "genes"), one allele for each payment obligation in the accounts payable 114. Each allele corresponds to a payment obligation in the accounts payable 114 and has information from which the amount of payment for the payment obligation can be derived. In a preferred embodiment, this information is encoded as a fractional (percentage) amount of the corresponding payment obligation to be made.

The genomes and the alleles will be explained in more detail with reference to FIG. 3. FIG. 3 shows N genomes $G_1$, $G_2, \ldots, G_N$ each of which has M alleles. For example, genome $G_1$ has alleles $g_{1,1}, g_{1,2}, g_{1,3}, \ldots, g_{1,M-1}$, and $g_{1,M}$. Likewise, genome $G_N$ has alleles $g_{N,1}, g_{N,2}, g_{N,3}, \ldots, g_{N,M-1}$, and $g_{N,M}$. The number of genomes N is determined so that the genetic algorithm of the present invention efficiently and thoroughly searches the solution space for an optimum bill payment plan 128. As stated above, the number of genomes N can be around 100. The number of alleles M in the genomes equals the number of payment obligations in the accounts payable 116 to be analyzed. In other words, each allele $g_{i,j}$ in one genome corresponds to one payment obligation in the accounts payable 116. This may be all outstanding accounts payable, or any subset selected by the user. For example, the user may select only payments due in the next 60 days.

Each allele in the genomes $G_1, G_2, \ldots, G_N$ represents a percentage of the amount of the payment obligation to be paid. In one embodiment, an allele 304 is represented by a 32-bit value indicating a payment percentage or fraction 314 of the bill to be paid. Note that other number of bits for the allele 304 may be used.

The payment percentage 314 is used to represent the percentage of the amount of the corresponding payment obligation to be paid, ranging from 0% to 100%. There are many different ways in which this value can be represented in the allele. In one embodiment, the allele stores an unsigned integer that represents the numerator of a quotient equaling the percentage, with the implicit denominator being the maximum unsigned integer that can be stored in a certain number of bits used for the percentage 314 of the payable amount to be paid. Therefore, the resultant quotient will be a number in the range of 0.0 to 1.0 in floating point form, which represents the percentage of the corresponding payable to be paid. A very simple example will suffice: Assume that the maximum number of bits is 32 as shown in FIG. 3, in which case the implicit denominator is "11111111111111111111111111111111" in binary form. Thus, a percentage 314 having a value "10000000000000000000000000000000" in binary form ultimately represents "10000000000000000000000000000000" divided by "11111111111111111111111111111111" (approximately 50%), which corresponds to the percentage of the amount of the payment obligation to be paid. As this should make clear then, the actual value stored for the percentage 314 in the allele 304 does not necessarily have to be the actual percentage of the payable, but only a value from which the actual percentage an be calculated. The use of unsigned integers in the alleles 304 has an advantage that it also helps avoiding epistasis, which is the inherent problem in genetic algorithms whereby a particular way of genome representation inhibits a genetic algorithm from finding an optimum solution to a problem. By using the entire bit field to represent the space of possible numerators, the entire range of possible percentages between 0 and 100% can be most effectively explored by the genetic algorithm.

According to one embodiment, the genomes in the initial genome population are randomly generated. The genetic algorithm module 100 of the present invention utilizes a bit-string uniform procedure in randomly generating the genomes, by assigning 0 or 1 to each bit in a genome with equal probability. To this end, the genetic algorithm module 100 first chooses randomly a bit density d corresponding to each bit in the genome from a uniform distribution, wherein $0 <= d <= 1$. Then, the genetic algorithm module 100 randomly sets each bit of each of the alleles 304 in a genome to one (1) with a probability of d corresponding to the bit. This will result in genomes evenly distributed in the binary space. It should be noted that this initialization is with respect to the entire genome treated as single bit string, and temporarily ignoring the separation of the individual alleles. Thus, for example, if each allele is represented by a 32-bit value, and there are 10 alleles, then the genome is treated as a 320-bit string during the initialization process. The values of each allele are then the values of each corresponding 32-bit word in the bit string.

Additionally, in accordance with another embodiment of the present invention, selected ones of the genomes in the initial genome population are initialized with predetermined values thereby giving structured data for the genetic algorithm module 100 to draw on. For example, including a genome of all zeros (0) and a genome of all ones (1) in the initial genome population will help the genetic algorithm module 100 to find solutions at the very ends of the solution space. Any number of other fixed genomes may be added to the initial population, though this is likely to affect the quality of the overall search of the solution space.

Determining Fitness of Genomes by Use of Objective Function

Referring back to FIG. 2, the fitness of the genomes in the genome population is then determined 204 by the scoring module 104 to obtain a fitness score by using a composite objective function, respective objective functions and related objectives and weights 122. Determining the fitness of a genome is equivalent to determining how close the genome comes to optimizing or satisfying the specified objectives when the bill payment plan 128 represented by the genome is applied to the accounts payable 116. The objectives themselves include maximizing the amount of payment 126 to be made for the given day within the limits of the available cash 114.

According to one embodiment of the invention, the fitness scores of the genomes in the genome population are determined by (i) evaluating the genome in the genome population to determine the payments corresponding to each payment obligation, and thus the results of each objective function $O_i$; (ii) obtaining a composite genome objective value $O_{comp}$ from the weighted combination of the objective functions, using the weights associated with each objective function; and (iii) computing a fitness score F for each genome by applying a fitness function to the composite genome objective value $O_{comp}$ corresponding to each genome. The fitness function will be illustrated in detail below.

The composite genome objective value $O_{comp}$ for each genome in the genome population is calculated by first applying the evaluated genome to the accounts payable 116, and using the respective objective functions, to compute the objective values $O_G$ for each underlying objective (minimizing late fees, maximizing discounts, and the like). That is, for each objective, there is an objective function to which the bill payment plan defined by the genome is applied; the result of the each objective function is the objective value $O_G$. Then, the objective values $O_G$ from all of the objective functions are normalized and standardized to obtain normalized, standardized objective values $O_i$ for each underlying objective. Finally, the normalized, standardized objective values $O_i$ are weighted and summed by a composite objective function to obtain a composite genome objective value $O_{comp}$ corresponding to the evaluated genome.

As illustrated in detail below, the objective values $O_G$ for each underlying objective may be calculated by applying the evaluated genome to the accounts payable 116 to assess the impact of the bill payment plan 128 represented by the evaluated genome upon the various objectives. Each objective is associated with an objective value $O_G$. The best (optimum) and worst objective values $O_A$ and $O_Z$ corresponding to each underlying objective can also be calculated by analyzing the nature of the underlying objective.

Also as illustrated in detail below, the objective values $O_G$, for each underlying objective are normalized (to a value between 0 and 1) and standardized (optimal value is 0, worst value is 1) to generate normalized, standardized objective values $O_i$. Normalization and standardization of the objective values allow the different values/scales of each objective value corresponding to different objectives to be summed together, because they are now unitless relative values, not dollar values or other objective-specific values any more.

The normalization and standardization of the objective values $O_G$ may be done in a different manner for different objectives by analyzing the nature of the objectives. For most objectives, the normalized, standardized objective value $O_i$, can be computed by dividing the difference between the calculated objective value $O_G$ and the best (or desired) objective value $O_A$ by a normalization factor, which for most underlying objectives is the difference between the worst objective value $O_Z$ and the best objective value $O_A$, i.e., by the formula $O_i=|O_G-O_A|/|O_A-O_Z|$. However, the normalization factor can be different from $|O_A-O_Z|$ depending upon the type of objective to be optimized.

The following is an illustration of the manner in which $O_G$, $O_A$, $O_Z$ and $O_i$ are computed for a given genome in the genome population for various objectives in accordance with one embodiment of the present invention. These objectives listed below are merely exemplary, and can include other objectives that are not listed herein.

Calculating the normalized, standardized objective value $O_i$ for the objective of maximizing the amount 126 of payments made on a given day within the limits of the amount 114 of cash available for a given day: Here, $O_A$ is equal to the amount 114 of cash available for a given day (the entire available cash 114 is used for payment of bills on the given day) and the value $O_Z$ is equal to zero (none of the available cash 114 is used for payment of bills on a given day). $O_G$ is the amount 126 of cash to used for bill payments on a given day when the genome G is applied to the accounts payable 116, and can be determined by translating the payable parameters (the payment percentage 314) in each allele of the genome into an actual payment amount for the corresponding payment obligation in the accounts payable 116 and adding up all the actual payment amounts. The normalized, standardized objective $O_i=|O_A-O_G|/|O_A-O_Z|$.

In another embodiment, the objectives 122 may be to minimize (rather than maximize) the amount of payments made on a given day within the limits of the amount of cash available for a given day while satisfying the other objectives. In such case, $O_Z$ is equal to the amount 114 of cash available for a given day (the entire available cash 114 is used for payment of bills on the given day) and the value $O_A$ is equal to zero (none of the available cash 114 is used for payment of bills on a given day). $O_G$ is still the amount 126 of cash to used for bill payments on a given day when the genome G is applied to the accounts payable 116, and can be determined by translating the payable parameters (the payment percentage 314) in each allele of the genome into an actual payment amount for the corresponding payment obligation in the accounts payable 116 and adding up all the actual payment amounts. The normalized, standardized objective $O_i=|O_A-O_G|/|O_A-O_Z|$.

Calculating the normalized, standardized objective value $O_i$ for the underlying objective of maximizing or minimizing payments to a certain vendor or a certain account depending upon the importance of the vendor or account: Vendor or account importance is a user-specified value assigned to each payment obligation in the accounts payable 116 and represents a degree of importance of payment of a certain payment obligation by the due date or in full. Businesses may have different business relations with different vendors or may view certain accounts more important than others, and thus would have different priorities in making payments to the vendors or accounts by the due date or in full. According to one embodiment of the present invention, the higher the importance value for a particular payment obligation is, the more favored the non-fulfillment of that payment obligation is, that is the more the user wishes to fulfill that payment obligation in full by the due date. Vendor or account importance values can be input to the module 100 as one of the objectives 122, and may be in the range of 0 to 1. Alternatively, each payment can be associated with an importance value, and stored in the accounting information or database, such that this information can then be looked up when the genome is evaluated. $O_A$ is 0 (unimportant) and $O_Z$ is 1 (very important, most disfavored non-payment). $O_G$ is the average importance value for all the payment obligations when the evaluated genome is applied to the accounts payable 116. $O_G$ is calculated by (i) adding the importance values corresponding to the payment obligations in which at least a fraction of the payment obligations are paid and (ii) dividing the total importance value by the number of payment obligations in the accounts payable 116. The normalized, standardized objective value $O_i=|O_A-O_G|/|O_A-O_Z|$. Note that separate importance values may be assigned to indicate vendor importance and account importance and thus separate importance values may be calculated accordingly depending upon the embodiment.

Calculating the normalized, standardized objective value $O_i$ for the underlying objective of maximizing discounts: Here, $O_A$ is equal to the sum of all discounts available in the accounts payable and $O_Z$ is zero (no discounts). The discount information is also part of the accounts payable information 116, so the genetic algorithm module 100 may readily calculate $O_A$ based upon such information. $O_G$ is the amount of discounts to be obtained when the evaluated genome is applied to the accounts payable 116, and can be calculated by adding the discounts available when at least a fraction of the payment obligations are paid. The normalized, standardized objective value $O_i=|O_A-O_G|/|O_A-O_Z|$.

Calculating the normalized, standardized objective value $O_i$ for the underlying objective of minimizing late payment penalties: Here, $O_A$ is zero (no late payment penalties) and $O_Z$ is the sum of all late payment penalties associated with the payment obligations when all payment obligations are paid late. In another embodiment, $O_Z$ may be a sum of a predetermined late fee and a predetermined percentage of the total payable amount. As stated above, the late payment information is also part of the accounts payable information 116, so the genetic algorithm module 100 may readily calculate $O_Z$ based upon such information. $O_G$ is the amount of late payment penalties to be paid when the evaluated genome is applied to the accounts payable 116. Each allele 304 in the evaluated genome is applied to each payment obligation in the accounts payable 116, and may incur a late payment fee if the payment date (the date when the genetic algorithm module 100 is run) is later than the due date depending upon the late payment penalties. The normalized, standardized objective value $O_i=|O_A-O_G|/|O_A-O_Z|$.

Calculating the normalized, standardized objective value $O_i$ for the underlying objective of minimizing new late payment penalties: Here, $O_A$ is zero (no new late payment penalties) and $O_Z$ is the sum of all new late payment penalties if all payments are made late. As stated above, the late payment information is also part of the accounts payable information 116, so the genetic algorithm module 100 may readily calculate $O_Z$ based upon such information. $O_G$ is the amount of new late payment penalties to be incurred when the evaluated genome is applied to the accounts payable 116. Each allele 304 in the evaluated genome is applied to each payment obligation in the accounts payable 116, and may incur a new late payment fee if a payment due on the effective date is not paid according to the account payable's late payment information. The normalized, standardized objective value $O_i=|O_A-O_G|/|O_A-O_Z|$.

Calculating the normalized, standardized objective value $O_i$ for the underlying objective of favoring late payables: This objective is to minimize the payment of payment obligations that do not carry a late fee for late payments after the due date ("late payables"). Here, $O_A$ is zero (no payment of late payables) and $O_Z$ is the sum of the amount of all late payables. As stated above, the late payment information is also part of the accounts payable information 116, so the genetic algorithm module 100 may readily calculate $O_Z$ based upon such information. $O_G$ is the amount of payments of the late payables to be made when the evaluated genome is applied to the accounts payable 116. Each allele 304 in the evaluated genome is applied to each payment obligation in the accounts payable 116, and the sum of the payment amount of the late payables according to the evaluated genome is calculated to obtain $O_G$. The normalized, standardized objective value $O_i=|O_A-O_G|/|O_A-O_Z|$.

Calculating the normalized, standardized objective value $O_i$ for the underlying objective of favoring aged payables: This objective is to favor the payment of payment obligations that have aged longer ("aged payables") as a function of the age of the payable and its terms. Businesses would generally favor paying payment obligations with longer terms because the payee had to wait longer for payment. For example, between a payable with a term of 30 days and a payable with a term of 90 days and both being 10 days before being due, the payable with 90 days will be favored. Here, $O_A$ is zero and $O_Z$ is the sum of the amount of all payables. $O_G$ is the amount of payments of the aged payables to be made when the evaluated genome is applied to the accounts payable 116. Each allele 304 in the evaluated genome is applied to each payment obligation in the accounts payable 116 to derive payment amounts for corresponding to the payment obligations, and those amounts are weighted (multiplied) down by the age of the corresponding payment obligation divided by the term of the payment obligation, and the sum of the weighted payment amount of the longer term payables according to the evaluated genome is calculated to obtain $O_G$. This weighting thereby favors more aged payables because as the aging approaches the term of the payable, the weight moves from 0 to 1. The normalized, standardized objective value $O_i=|O_A-O_G|/|O_A-O_Z|$.

Calculating the normalized, standardized objective value $O_i$ for the objective of minimizing delivery cost: Every mailing of a check would require a postage fee or any other type of delivery fee (such as courier fee). Urgent mailings of payments generally require a higher postage fee such as a courier fee. Therefore, businesses generally prefer mailing a payment well in advance of a payment due date. Thus, this objective prefers a bill payment plan that results in making payments sufficiently prior to their due date to avoid extra postage fees. Here, $O_A$ equals the amount of delivery cost when all the payments in the accounts payable 116 are sent using the least expensive delivery method, and $O_Z$ equals the amount of delivery cost when all the payments in the accounts payable 116 are sent using the most expensive delivery method. $O_G$ is the amount of delivery cost incurred when payments are made and mailed in accordance with the represented by the genome to be evaluated. Since it is assumed that the payments are made on the day on which the genetic algorithm module 100 is run, it is possible to determine the delivery cost required for the payment to arrive prior to the payment due date by using postage rate or courier fee information. The postage or courier fee information can be input to the genetic algorithm module 100 as other relevant data 124. The normalized, standardized objective value $O_i=|O_A-O_G|/|O_A-O_Z|$.

Calculating the normalized, standardized objective value $O_i$ for the underlying objective of favoring the least recently paid: This objective is to maximize the payment of payment obligations to payees who have not been recently paid ("least recently paid vendor," e.g., a vendor who has not received funds for some predetermined time is favored over vendors who have been recently paid funds without regard to other payment terms). Here, $O_Z$ is zero (no payment of least recently paid vendors) and $O_A$ is the sum of the amount of all least recently paid vendors. $O_G$ is the amount of payments to the least recently paid vendors to be made when the evaluated genome is applied to the accounts payable 116. Each allele 304 in the evaluated genome is applied to each payment obligation in the accounts payable 116, and the sum of the payment amount to the least recently paid vendors according to the evaluated genome is calculated to obtain $O_G$. The normalized, standardized objective value $O_i=|O_A-O_G|/|O_A-O_Z|$.

Calculating the normalized, standardized objective value $O_i$ for the underlying objective of maximizing or minimizing full payments: Here, if the objective is to minimize full payments, then $O_A$ is zero (no full payments) and $O_Z$ is the sum of the amount of all payables 116. If the objective is to maximize full payments, then $O_A$ is the sum of the amount of all payables 116 (all full payments) and $O_Z$ is zero (no full payments). $O_G$ is the amount of full payments to be made when the evaluated genome is applied to the accounts payable 116. Each allele 304 in the evaluated genome is applied to each payment obligation in the accounts payable 116, and the sum of the payment amount of the full payments (when the allele 304 indicates 100% payment) according to the evaluated genome is calculated to obtain $O_G$. The normalized, standardized objective value $O_i=|O_A-O_G|/|O_A-O_Z|$.

Calculating the normalized, standardized objective value $O_i$ for the underlying objective of maximizing or minimizing partial payments: Here, if the objective is to minimize partial payments, then $O_A$ is zero (no partial payments) and $O_Z$ is the sum of the amount of all payables. If the objective is to maximize partial payments, then $O_A$ is the sum of the amount of all payables and $O_Z$ is zero (no partial payments). $O_G$ is the amount of partial payments to be made when the evaluated genome is applied to the accounts payable 116. Each allele 304 in the evaluated genome is applied to each payment obligation in the accounts payable 116, and the sum of the payment amount of the partial payments (when the allele 304 indicates less than 100% payment) according to the evaluated genome is calculated to obtain $O_G$. The normalized, standardized objective value $O_i=|O_A-O_G|/|O_A-O_Z|$.

Calculating the normalized, standardized objective value $O_i$ for the underlying objective of maximizing the number of payables paid: Here, $O_A$ is equal to the number of payables in the accounts payable 116 (all payables paid) and $O_Z$ is zero (no payables paid). $O_G$ is the number of payables paid when the evaluated genome is applied to the accounts payable 116. Each allele 304 in the evaluated genome is applied to each payment obligation in the accounts payable 116, and the number of payables at least a fraction of which is paid (when the allele 304 indicates fraction of payable greater than 0%)

according to the evaluated genome is calculated to obtain $O_G$. The normalized, standardized objective value $O_i = |O_A - O_G| / |O_A - O_Z|$.

Calculating the normalized, standardized objective value $O_i$ for the underlying objective of minimizing the number of total days late: Here, $O_A$ is zero (zero late days) and $O_Z$ is the total late days when none of the payables are paid. $O_G$ is the total number of late days when the evaluated genome is applied to the accounts payable 116. Each allele 304 in the evaluated genome is applied to each payment obligation in the accounts payable 116, and the number of late days according to the evaluated genome is calculated to obtain $O_G$. Since it is assumed that the payments are made on the day on which the genetic algorithm module 100 is run, it is possible to determine the number of late days by adding up the late days for the payables that are not paid in full by the day on which the genetic algorithm module 100 is running. The normalized, standardized objective value $O_i = |O_A - O_G| / |O_A - O_Z|$.

Calculating the normalized, standardized objective value $O_i$ for the underlying objective of minimizing the number of total days early: Here, the objective is to minimize unnecessary payments earlier than the due date. $O_A$ is zero (zero early days) and $O_Z$ is the total early days when all the payables are paid. $O_G$ is the total number of early days when the evaluated genome is applied to the accounts payable 116. Each allele 304 in the evaluated genome is applied to each payment obligation in the accounts payable 116, and the number of early days according to the evaluated genome is calculated to obtain $O_G$. Since it is assumed that the payments are made on the day on which the genetic algorithm module 100 is run, it is possible to determine the number of early days by adding up the early days for the payables that are paid by at least a fraction on the day on which the genetic algorithm module 100 is run. The normalized, standardized objective value $O_i = |O_A - O_G| / |O_A - O_Z|$. After the standardized, normalized objective values $O_i$ for the respective underlying objectives are calculated for the evaluated genome, the composite genome objective value $O_{comp}$ for the evaluated genome can be obtained by the following composite objective function:

$$O_{comp} = \sum_{i=1}^{n} w_i O_i$$

where
$O_i$ is the normalized, standardized objective value for each objective;
$w_i$ is a weight for each objective; and
n is the number of objectives to be optimized.

The weights are importance levels (either predetermined or specified by the user) in the range of 0 to 1 and are normalized so that they add up to 1. Each weight corresponds to an objective. Since the $O_i$'s are normalized and standardized values, a composite genome objective value $O_{comp}$ of zero (0) is the best (optimum) value and one (1) is the worst value.

In the manner described above, the composite genome objective values $O_{comp}$'s corresponding to each the genomes in the genome population are determined. Thereafter, the fitness score F for each genome in the genome population is obtained by applying a fitness function to each composite genome objective value $O_{comp}$. The fitness function is applied to the composite genome objective values in order to redistribute the genomes in the solution space such that the genomes are distributed in a way more effective for the genetic algorithm to explore. According to one embodiment of the present invention, the fitness score F for each genome in the genome population can be obtained by sigma truncation:

$$F = O_{comp} - (O_{average} - c * O_\sigma)$$

where
$O_{comp}$ is the composite genome objective value for the genome;
$O_{average}$ is the average of the composite genome objective values $O_{comp}$'s corresponding to all of the genomes in the genome population;
c is a scaling factor, preferably equal to 2, according to one embodiment of the present invention; and
$O_\sigma$ is the standard deviation of the composite genome objective values $O_{comp}$'s corresponding to all of the genomes in the genome population.

In this manner, the fitness scores F of all the genomes in the genome population can be determined. The fitness scores F of all the genomes are also in the range of 0 to 1. The use of a fitness function, although optional, ensures better alleles get an exponentially better change to propagate.

Termination Criteria

After the fitness scores of all the genomes in the genome population is calculated, it is determined 206 whether or not the termination criteria are satisfied. The termination criterion is one of two circumstances:

(i) at least one of the genomes in the genome population represents a bill payment plan 128 for the payment obligations in the accounts payable 116 such that the payment of the accounts payable 116 in accordance with the alleles in the genome most nearly optimizes the objectives 122 (including maximizing the payment amount 126 within the limits of the available cash 114; or (ii) the number of generations (or alternatively amount of time) for modifying the genome population has exceeded a certain limit applicable to modifying one genome population.

The user of the genetic algorithm module 100 can specify how nearly the objectives should be optimized by the bill payment plan 128 represented by the genomes. For example, when one of the objective is to maximize the amount of payments to be made on a given day within the limits of the available cash on that day, the user can specify a threshold percentage for the ratio of the payment amount 126 to the available cash 114 or a threshold amount by which the payment amount 126 may be less than the available cash 114. When the ratio of the payment amount 126 to the available cash 114 exceeds the threshold percentage or when the difference between the available cash 114 and the payment amount 126 becomes less than the threshold amount, the termination criterion is satisfied. Alternatively, the user can, specify a threshold fitness score, and when the fitness score of at least one of the genomes in the genome population is lower than the threshold fitness score, the termination criterion is satisfied.

The number of generations limit for one genome population as the termination criteria is preferably set as 300, such that the genetic algorithm terminates when the number of generations of one genome population exceeds 300. According to another embodiment, another termination condition is used in conjunction with the maximum number of generations. Here, after the number of generations exceeds the maximum, then it is determined whether or not the ratio of the best fitness score in the first generation F1 to the best fitness score in the current generation Fc is smaller than 1, i.e., F1/Fc<=1.

If this ratio is smaller than or equal to 1, then the genetic algorithm is terminated because this means that the fitness score is not getting better (i.e., not getting lower) for further generations. If the ratio is larger than 1 (i.e., F1>Fc), then the genetic algorithm is not terminated because this means that the fitness score is getting better (i.e., getting lower) for further generations and it is worth trying the subsequent generations to find an optimum solution. In still another embodiment, after the number of generations exceeds the maximum, then it is determined whether or not the ratio of the $F_{c-max}/F_c <= 1$, where $F_{c-max}$ is the fitness score of the c-max$^{th}$ generation, max is the maximum number of generations, and Fc is fitness score of the current generation. In such embodiment, only the latest max generations are reviewed. If this ratio is smaller than or equal to 1, then the genetic algorithm is terminated because this means that the fitness score is not getting better (i.e., not getting lower) for further generations. If the ratio is larger than 1 (i.e., $F_{c-max} > F_c$), then the genetic algorithm is not terminated because this means that the fitness score is getting better (i.e., getting lower) for further generations and it is worth trying the subsequent generations to find an optimum solution.

If one of the termination criteria is satisfied 206, the results are reported 210 and the process is returned 212 to the user, when the genetic algorithm module 100 has satisfied 208 the goal of optimizing the objectives. If the goal is not satisfied 208, then it is determined 214 whether or not the execution time applicable to the entire genetic algorithm has exceeded a certain limit. If so, then the process is returned 212 to the user with the current best results. If not, the process returns to initialize 202 the genome population again and restarts the genetic algorithm. According to one embodiment, a user imposes this time limit for the entire genetic algorithm of the application. In another embodiment, this time limit is predetermined in the genetic algorithm module 100 itself. The results returned to the user may be displayed to the user by using any form of user interface, such as a graphical user interface, textual report, and the like.

Selection of Genomes for Mating

If the termination criteria are not satisfied 206, the selection module 106 in the genetic algorithm module 100 proceeds to select 216 genomes for mating. The selection can be carried out by roulette wheel selection, tournament selection, or any other type of selection method typically used by genetic algorithms.

According to one embodiment of the present invention, roulette wheel selection is used to give every genome in the genome population a chance of mating, the chance of mating for each genome being proportional to the determined fitness score of each genome. To this end, the fitness score $F_j$ for genome$_j$ is used as a threshold and a random number R in the range of 0 to 1 is selected. The genome is selected for mating if $R > F_j$. Otherwise the genome is skipped. Because very good genomes will have very low $F_j$'s, R will more likely be greater than their fitness $F_j$. Very poor genomes are less likely to be picked since their fitness scores will be relatively higher. Roulette wheel selection is continued until the genetic algorithm module 100 has selected two mating genomes from the genome population.

According to another embodiment, tournament selection is used for selecting the mating genomes. Specifically, a first superior genome is selected from a first set of two randomly chosen genomes in the initial genome population. Then, a second superior genome is additionally selected from a second set of two randomly chosen genomes in the initial genome population. The first and second superior genomes are the selected genomes for mating. Superiority of each genome is determined based on the fitness score for each genome computed above. Tournament selection is continued until the genetic algorithm module 100 has selected two mating genomes from the genome population.

Mating Genomes to Create Offspring Genomes

Thereafter, the two selected genomes are mated 218 by the mating module 108 to create offspring genomes. According to one embodiment of the present invention, the selected genomes are mated by single-point crossover. Single-point crossover is performed by randomly selecting a common crossover point in a first mating genome and a second mating genome among the selected mating genomes. In one embodiment, the crossover point is at one of the boundaries of the alleles in the genome. The first mating genome has a first portion and a second portion divided by the common crossover point and the second mating genome also has a first portion and a second portion divided by the common crossover point. Then, the second portion of the first mating genome is replaced with the second portion of the second mating genome to create an offspring genome.

In another embodiment, two-point crossover is used for mating. Two-point crossover is performed by selecting two crossover points (here, boundaries of alleles), copying the part from the beginning of the genome to the first crossover point from the first mating genome, copying the part from the first to the second crossover point from the second mating genome, and copying the part from the second crossover point to the end of the genome from the first mating genome, so as to create an offspring genome. Two-point crossover has a higher crossover rate than single point crossover.

In still another embodiment, uniform crossover is used for mating. Uniform crossover is performed by randomly copying from either the first mating genome or the second mating genome to create an offspring genome. That is, the length of the genome is traversed and at each bit location a bit is copied into the offspring genome from either the first mating genome or the second mating genome, using a random selection function to select which parent genome's bit it copied into the offspring.

According to still another embodiment of the present invention, arithmetic crossover is used for mating. Arithmetic crossover is carried out by performing a certain arithmetic operation with the first and second mating genomes to create an offspring genome. For example, the first and second mating genomes represented can be added to obtain the offspring genome.

Mutating Offspring Genomes

Thereafter, the offspring genomes are mutated 220 at a low frequency by the mutation module 110. According to one embodiment of the present invention, the mutation rate is 0.01%, and this is implemented by selecting a single integer in the range of 1 to 10,000, and mutating only when a randomly selected number in the range equals the selected integer. Another approach is to set the mutation rate as the threshold itself, and mutate only if a randomly selected number is below the threshold. The low frequency mutation rate is selected such that it is high enough for the genetic algorithm to explore the solution space effectively but low enough to prevent destruction of information obtained during mating. Mutation is carried out by (i) selecting a bit in the offspring genome to mutate by random selection in a uniform distribution, and (ii) changing the selected bit in the offspring genome from zero (0) to one (1), or vice versa, according to the mutation rate. In another embodiment, mutation can also be carried out by (i) selecting a bit in the offspring genome to mutate by random selection in a uniform distribution, (ii) determining what value to change the selected bit also by random selection, and (iii) changing the selected bit according to the determined value.

Inserting Offspring Genomes into Genome Population

Thereafter, the offspring genomes are inserted 222 into the genome population and a new generation genome population is obtained based on a replacement strategy by the replacement module 112. In one embodiment, the replacement strategy adds the offspring genome to the initial genome population to obtain a modified genome population. Then, the fitness score of each genome in the modified genome population is determined in the manner described above. Thereafter, a first predetermined number or percentage of the worst vectors are removed from the modified genome population based upon the determined fitness of the modified genome population. Finally, a second predetermined number or percentage of the best vectors in the initial genome population are added to the modified genome population based upon the determined fitness of the initial genome population. For example, 25 worst/best vector maybe selected, or alternatively the 10% worst/best vectors. The resultant modified genome population is the new (next generation) genome population.

Then, the process returns to determine 204 the fitness of the new genome population as described above. The above process is repeated until the termination criteria are satisfied 206.

The genetic algorithm module 100 is able to search an enormous, non-linear search space with a number of interdependent variables to find a near optimal solution for optimizing or satisfying numerous objectives specified by the user. Numerous (possibly conflicting) objectives can be weighted by the importance levels and optimized at the same time. The objectives can include maximizing the amount of payment of the payment obligations within the limits of the available cash. Moreover, the genetic algorithm module 100 is not limited to a certain type of payment and can be used with any type of payment obligations in the accounts payable 116. In addition, the solution can be found in an acceptable or interactive period of time, such as a few seconds to a few minutes.

It is also possible to use two or more of the genetic algorithm modules 100 at the same time in order to more efficiently find the optimum solution to the bill payment plan 128. One embodiment of the present invention uses two genetic algorithm modules 100, including an "exploiting" genetic algorithm and an "exploring" genetic algorithm. The exploiting genetic algorithm uses a mating method having a high crossover rate but will use a low mutation rate for mutation. This configuration allows this genetic algorithm to very effectively search the local space for better genomes. The exploring genetic algorithm uses a mating method having a low crossover rate but use a high mutation rate for mutation. This configuration allows the genetic algorithm to search over a very large amount of the entire solution space. If during any iteration, the exploring genetic algorithm finds a better solution than the exploiting genetic algorithm, the genome population in the exploring genetic algorithm is used to replace the genome population in the exploiting genetic algorithm and the exploring genetic algorithm is reinitialized. The population shift gives the exploiting genetic algorithm the 'better' population to search through, while the exploring genetic algorithm is redirected to evaluate a new portion of the solution space.

As a further refinement of this dual genetic algorithm approach, the relative amounts of processing time given to the exploring genetic algorithm and the exploiting genetic algorithm can be systematically varied. To begin with, the exploring genetic algorithm is given a majority portion of the available processing time, and the exploiting genetic algorithm is given a minority portion. As the number of iterations increases, the exploiting genetic algorithm is given progressively more processing time, and the exploring genetic algorithm is given progressively less; this change in processing time can be linear or non-linear. In this manner, the solution to the bill payment plan 128 optimizing the objectives 122 may be found in a more efficient manner, since the solution space is vigorously searched by the exploring genetic algorithm in the early stages of the process and then the solution is vigorously optimized by the exploiting genetic algorithm in the later stages of the process.

It is also possible to use multiple different genome populations as the initial genome populations and run them simultaneously according to the genetic algorithm, rather than use one initial genome population. For example, one embodiment of the present, invention utilizes 10 genome populations in parallel. This would result in reduction of the time required for finding the solution but would also be a heavier computational burden on the computer that runs the genetic algorithm.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application speciffc integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of determining an optimal bill payment plan corresponding to a plurality of payment obligations in accounts payable of a finance account while evaluating a plurality of objectives related to amounts of payments in the bill payment plan for a day, comprising a 24 hour period, the computer-implemented method comprising:

generating, by a computer processor, a genome population having a first set of vectors, each vector representing the bill payment plan, numerically defining for each payment obligation a payment amount; and modifying iteratively, by the computer processor, the genome population using a genetic algorithm until a vector of the first set of vectors forming the optimal bill payment plan is determined that maximizes a total amount of payment of the payment obligations on the day within an amount of available cash in the finance account for the day while simultaneously evaluating the plurality of objectives, wherein the genetic algorithm comprises determining a fitness for the vector of the first set of vectors, and wherein determining the fitness for the vector comprises:

obtaining a plurality of objective values ($O_G$) for the plurality of objectives, wherein the plurality of objective values represent a plurality of degrees of optimization of the plurality of objectives when the payment obligations are paid in accordance with the bill payment plan represented by the vector, normalizing and standardizing the plurality of objective values ($O_G$) to obtain a plurality of normalized, standardized objective (NSO) values ($O_i$) for the plurality of objectives, obtaining a composite objective value ($O_{comp}$) corresponding to the vector by the following equation:

$$O_{comp} = \sum_{i=1}^{n} w_i O_i$$

where
$O_{comp}$ is the composite objective value corresponding to the vector,
$O_i$ is the NSO value corresponding to the plurality of objectives,
$w_i$ is a weight corresponding to the plurality of objectives, and
n is a number of objectives, and applying a fitness function to the composite objective value $O_{comp}$ to obtain a fitness score corresponding to the vector.

2. A computer-implemented method of determining a bill payment plan corresponding to a plurality of payment obligations in accounts payable of a finance account while evaluating one or more objectives related to amounts of payments in the bill payment plan, the computer-implemented method comprising:

generating, by a computer processor, a genome population having a first set of vectors, each vector in the first set of vectors representing the bill payment plan for a day, comprising a 24 hour period, numerically defining a payment amount corresponding to each payment obligation in the accounts payable;

obtaining a plurality of objectives with respect to the bill payment plan, each objective associated with a weight indicating the importance of the objective; and modifying, by the computer processor, the genome population by use of a genetic algorithm, including:

determining a fitness for each of the vectors in the genome population using objective values, the objective values determined by applying objective functions to the vectors, each objective value weighted by a corresponding weight, wherein determining the fitness for each vector comprises:

obtaining objective values ($O_G$) corresponding to associated objectives, each objective value representing a degree to which an associated objective of the associated objectives is optimized when the payment obligations are paid in accordance with the bill payment plan represented by the vector, normalizing and standardizing each of the objective values ($O_G$) to obtain normalized, standardized objective values ($O_i$) corresponding to each of the objectives, obtaining a composite objective value ($O_{comp}$) corresponding to the vector by the following equation:

$$O_{comp} = \sum_{i=1}^{n} w_i O_i$$

where $O_{comp}$ is the composite objective value corresponding to the vector, $O_i$ is the normalized, standardized objective value corresponding to each of the objectives, $w_i$ is a weight corresponding to each objective, and n is a number of objectives, and applying a fitness function to the composite objective value $O_{comp}$ to obtain a fitness score corresponding to the vector; and introducing new vectors in the genome population derived from other vectors including the first set of vectors, until at least one of the vectors in the genome population represents the bill payment plan for the day, such that payment of each payment obligation in the accounts payable in accordance with the bill payment plan maximizes a total amount of payment of the payment obligations within an amount of available cash in the finance account for the day while simultaneously evaluating the one or more objectives.

3. The computer-implemented method of claim 2, wherein generating a genome population having a first set of vectors comprises generating the first set of vectors by random selection of numerical values representing the payment amount corresponding to each payment obligation in the accounts payable.

4. The computer-implemented method of claim 2, wherein each vector in the first set of vectors comprises a plurality of alleles each including a plurality of bits, and obtaining a genome population having a first set of vectors comprises:

randomly choosing a bit density d from a uniform distribution, wherein 0 is less than or equal to d and less than or equal to 1; and in each of the first set of vectors, randomly setting each bit of each allele to one with a probability of d.

5. The computer-implemented method of claim 2, wherein each vector in the genome population includes a plurality of alleles, each allele corresponding to a payment obligation in the accounts payable and indicating a fractional payment amount.

6. The computer-implemented method of claim 2, wherein introducing new vectors in the genome population comprises:

selecting mating vectors from the first set of vectors based on the fitness of each of the first set of vectors;

mating the selected mating vectors to obtain a second set of vectors;

mutating the second set of vectors to obtain a third set of vectors; and replacing selected ones of vectors in the first set of vectors in the genome population with the third set of vectors.

7. The computer-implemented method of claim 6, wherein the mating vectors are selected by roulette wheel selection.

8. The computer-implemented method of claim 6, wherein the mating vectors are selected by tournament selection.

9. The computer-implemented method of claim 6, wherein the mating vectors are mated by single point crossover.

10. The computer-implemented method of claim 6, wherein replacing selected ones of vectors in the first set of vectors comprises:

adding the third set of vectors to the first set of vectors to obtain a modified first set of vectors;

determining fitness of each vector in the modified first set of vectors;

removing a first predetermined number of the worst vectors from the modified first set of vectors based upon the determined fitness of the modified first set of vectors; and adding a second predetermined number of the best vectors in the first set of vectors to the modified first set of vectors based upon the determined fitness of the first set of vectors.

11. The computer-implemented method of claim 2, wherein the fitness function comprises:

$$F = O_{comp} - (O_{average} - 2 \cdot O_\sigma)$$

where

F is the fitness score corresponding to the vector;

$O_{comp}$ is the composite objective value corresponding to the vector;

$O_{average}$ is an average of the composite objective values corresponding to all the vectors in the genome population; and $O_\sigma$ is a standard deviation of the composite objective values corresponding to all the vectors in the genome population.

12. The computer-implemented method of claim 2, wherein the weight is a user-specified value.

13. The computer-implemented method of claim 2, wherein the normalized, standardized objective value ($O_i$) corresponding to each objective is obtained by calculating a difference between the objective value ($O_G$) and an optimum objective value ($O_A$), and dividing the difference by a normalizing factor.

14. The computer-implemented method of claim 13, wherein the normalizing factor is a difference between the optimum objective value ($O_A$) and a worst objective value ($O_Z$).

15. The computer-implemented method of claim 2, wherein the associated objectives comprise maximizing the total amount of payments of the payment obligations within the amount of available cash in the finance account for the day.

16. The computer-implemented method of claim 2, wherein the associated objectives comprise maximizing or minimizing payments of important ones of the payment obligations according to user-specified importance levels.

17. The computer-implemented method of claim 2, wherein the associated objectives comprise maximizing discounts in the payment obligations.

18. The computer-implemented method of claim 2, wherein the associated objectives comprise minimizing late fees incurred by payment of the payment obligations.

19. The computer-implemented method of claim 2, wherein the associated objectives comprise minimizing new late fees incurred by payment of the payment obligations.

20. The computer-implemented method of claim 2, wherein the associated objectives comprise maximizing amount of payments of late payables in the payment obligations.

21. The computer-implemented method of claim 2, wherein the associated objectives comprise favoring payment of aged payables in the payment obligations.

22. The computer-implemented method of claim 2, wherein the associated objectives comprise minimizing delivery costs incurred by payment of the payment obligations.

23. The computer-implemented method of claim 2, wherein the associated objectives comprise maximizing payment of least recently paid ones of the payment obligations.

24. The computer-implemented method of claim 2, wherein the associated objectives comprise maximizing partial payment of the payment obligations.

25. The computer-implemented method of claim 2, wherein the associated objectives comprise minimizing full payment of the payment obligations.

26. The computer-implemented method of claim 2, wherein the associated objectives comprise maximizing number of payment obligations paid.

27. The computer-implemented method of claim 2, wherein the associated objectives comprise minimizing a total number of days of late payment of the payment obligations.

28. The computer-implemented method of claim 2, wherein the associated objectives comprise minimizing a total number of days of early payment of the payment obligations.

29. A computer readable medium storing computer executable instructions for determining an optimal bill payment plan corresponding to a plurality of payment obligations in accounts payable of a finance account while evaluating a plurality of objectives related to amounts of payments in the bill payment plan for a day, comprising a 24 hour period, the instructions comprising functionality for:

generating a genome population having a first set of vectors, each vector representing the bill payment plan, numerically defining for each payment obligation a payment amount; and modifying iteratively the genome population using a genetic algorithm until a vector of the first set of vectors forming the optimal bill payment plan is determined that maximizes a total amount of payment of the payment obligations on the day within an amount of available cash in the finance account for the day while simultaneously evaluating the plurality of objectives wherein the genetic algorithm comprises determining a fitness for the vector of the first set of vectors, and wherein determining the fitness for the vector comprises:

obtaining a plurality of objective values ($O_G$) for the plurality of objectives, wherein the plurality of objective values represent a plurality of degrees of optimization of the plurality of objectives when the payment obligations are paid in accordance with the bill payment plan represented by the vector, normalizing and standardizing the plurality of objective values ($O_G$) to obtain a plurality of normalized, standardized objective (NSO) values ($O_i$) for the plurality of objectives, obtaining a composite objective value ($O_{comp}$) corresponding to the vector by the following equation:

$$O_{comp} = \sum_{i=1}^{n} w_i O_i$$

where $O_{comp}$ is the composite objective value corresponding to the vector, $O_i$ is the NSO value corresponding to the plurality of objectives, $w_i$ is a weight corresponding to the plurality of objectives, and n is a number of objectives, and applying a fitness function to the composite objective value $O_{comp}$ to obtain a fitness score corresponding to the vector.

30. A computer-implemented method of determining an optimal bill payment plan corresponding to a plurality of payment obligations in accounts payable of a finance account while evaluating a plurality of objectives related to amounts of payments in the bill payment plan for a day, comprising a 24 hour period, the computer-implemented method comprising:

generating, by a computer processor, a genome population having a first set of vectors, each vector representing the bill payment plan, numerically defining for each payment obligation a payment amount; and modifying iteratively, by the computer processor, the genome population using a genetic algorithm until a vector of the first set of vectors forming the optimal bill payment plan is determined that minimizes a total amount of payment of the payment obligations on the day while simultaneously evaluating the plurality of objectives, wherein the genetic algorithm comprises determining a fitness for the vector of the first set of vectors, and wherein determining the fitness for the vector comprises:

obtaining a plurality of objective values ($O_G$) for the plurality of objectives, wherein the plurality of objective values represent a plurality of degrees of optimization of the plurality of objectives when the payment obligations are paid in accordance with the bill payment plan represented by the vector, normalizing and standardizing the plurality of objective values ($O_G$) to obtain a plurality of normalized, standardized objective (NSO) values ($O_i$) for the plurality of objectives, obtaining a composite objective value ($O_{comp}$) corresponding to the vector by the following equation:

$$O_{comp} = \sum_{i=1}^{n} w_i O_i$$

where $O_{comp}$ is the composite objective value corresponding to the vector, $O_i$ is the NSO value corresponding to the plurality of objectives, $w_i$ is a weight corresponding to the plurality of objectives; and n is a number of objectives, and applying a fitness function to the composite objective value $O_{comp}$ to obtain a fitness score corresponding to the vector.

* * * * *